United States Patent Office 3,466,884
Patented Sept. 16, 1969

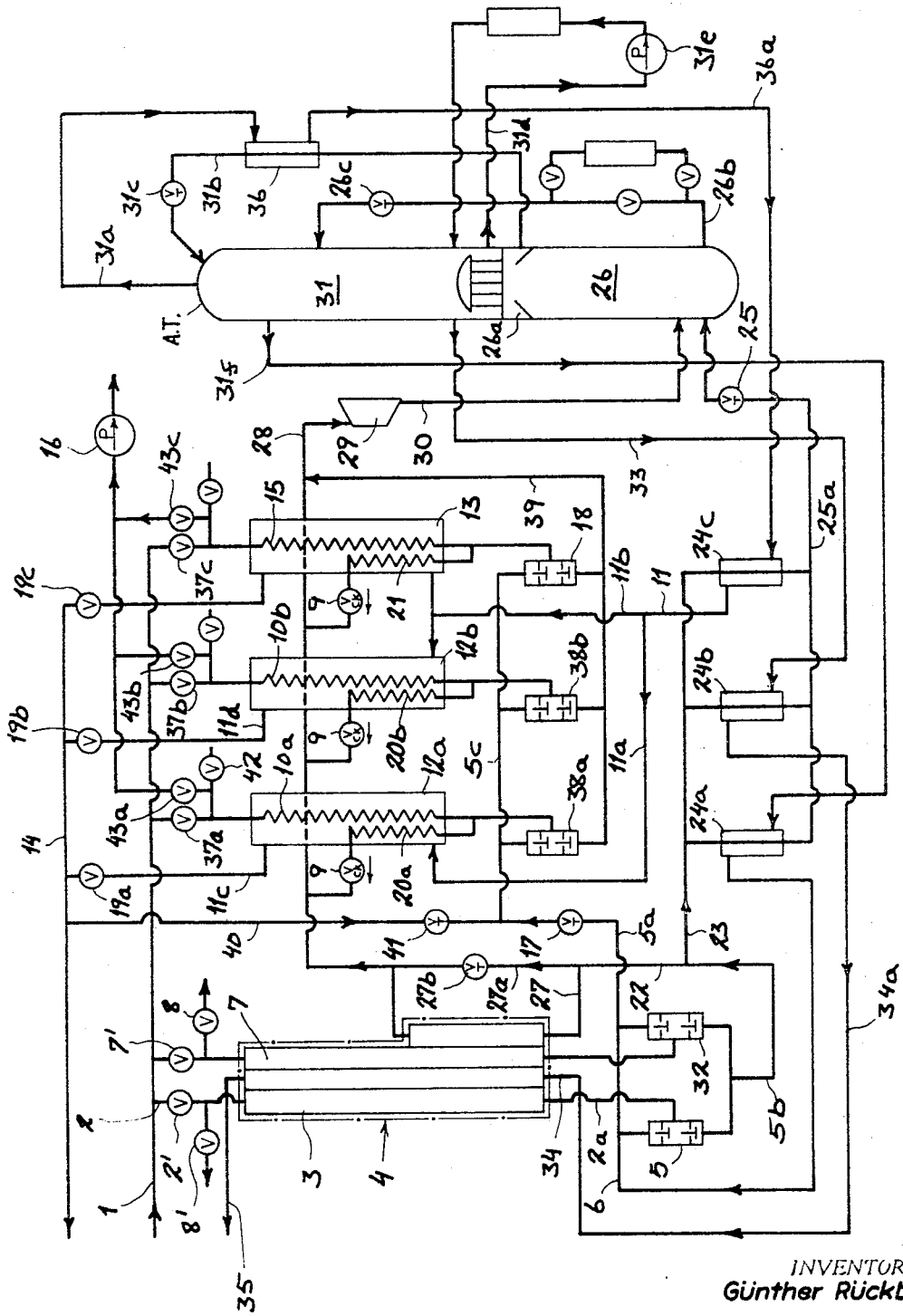

3,466,884
PROCESS AND INSTALLATION FOR THE REMOVAL OF EASILY CONDENSABLE COMPONENTS FROM GAS MIXTURES
Günther Rückborn, Munich-Grunwald, Germany, assignor to Linde Aktiengesellschaft, Wiesbaden, Germany, a corporation of Germany
Filed June 7, 1966, Ser. No. 555,762
Claims priority, application Germany, June 10, 1965,
G 43,843
Int. Cl. F25j 5/00
U.S. Cl. 62—13            6 Claims

ABSTRACT OF THE DISCLOSURE

Condensable components $CO_2$ and $H_2O$ are removed from air in indirect heat exchange with a returning product oxygen in a first section of the exchanger while the undesirable components precipitated in a previous cycle are flushed by a returning nitrogen product. Thereafter, the flow paths of the streams are alternated between the first and second sections, the functions of the respective fluids remaining unaltered. Another part of the air is subjected to indirect heat exchange in a third section which is thereafter reduced in pressure to 0.05 to 0.5 atmosphere to volatilize precipitated condensed components.

---

The present invention relates to a process and an installation for the removal of easily condensable components from gas mixtures and represents an improvement in the process and apparatus described and claimed in the commonly assigned copending application Ser. No. 389,-612, filed Aug. 14, 1964 (now U.S. Patent No. 3,364,686 of January 22, 1968).

For the purposes of the present invention, "easily condensable components" of gas mixtures will be understood to mean substances such as water vapor, cabron dioxide, ethylene, sulphur dioxide and hydrogen sulfide, which are usually present in gas mixtures which are to be rectified (e.g., to separate the major components from one another), purified, or otherwise treated. The removal of such components can be carried out by lowering the temperature of the gas mixture to a temperature level below the dew point of the particular component which it is desired to remove, thereby precipitating this component from the gas mixture. This process is superior to chemical stripping, washing, and surface-adsorption methods since these latter processes involve considerably more complex apparatus and expensive materials, while introducing other impurities; they also cannot readily be carried out in repetitive or cyclical systems. Moreover, the condensation of such easily condensable components is generally compatible with the further treatment of the gas mixtures since the removal operations are most often associated with cryogenic processes in which the gases are liquefied and/or cooled.

In the aforementioned copending application, it was pointed out that condensation-type precipitation of the easily condensable component could be satisfactorily effected periodically via functionally interchangeable heat exchangers in which the gas mixture is cooled to a temperature below the dew point of the easily condensable component to deposit the latter from the mixture, the deposited component being removed from the heat exchanger by subjecting it to a reduced pressure ranging from substantially 0.05 and 0.5 atmosphere after the gas mixture has been withdrawn from the chamber. In that application, it was shown that the use of a reduced pressure to facilitate volatilization of the condensed component improved the thermal efficiency of the system and was especially effective when the easily condensable component was swept from the heat exchanger under reduced pressure by a scavenging gas with a volume $M_s$ equal to between $P_sM_c/P_c$ and $3P_sM_c/P_c$ where $P_s$ is the scavenging gas pressure, $M_c$ is the volume of the gas mixure during deposition of the easily condensable component and $P_c$ is the pressure of the gas mixture. Thus, in one of the heat exchangers, a warm crude gas mixture is cooled by passing it in heat-exchanging relationship with a cold gas to condense the components in a first section of this heat exchanger while the corresponding section of the other heat exchanger—used for a similar function in the previous cycle—is subjected to the reduced pressure of 0.05 to 0.5 atmosphere to volatilize the condensed components therein. Upon substantially complete elimination of these components from the appropriate section of this latter heat exchanger and upon deposition of such components in the corresponding section of the first-mentioned heat exchangers, the heat exchangers are switched over and functionally interchanged with the process being repeated substantially continuously to generate a continuous supply of the cold gas free from the easily condensable impurities. Most advantageously, the reduced pressure to which the deposited components is subjected, is approximately 0.1 atmosphere (absolute) while the volume $M_s$ of the scavenging gas is equal approximately to $1.5P_sM_c/P_c$.

The heat exchangers used in this process are of the indirect heat-transfer type, generally, tube heat exchangers. The precipitation of easily condensable components is carried out in only one of the sections of the heat exchanger so that the other remains free from condensation and can be traversed by a cold stream of relatively poor gas without condensation. Both the cold purified gas and the crude gas are switched over to the next heat exchanger during the functional interchange mentioned earlier. If, in accordance with the basic principles of this method as described in the commonly assigned copending application mentioned above, it is desired to recover from the installation a second purified component, a further pair of heat exchangers are provided. Such an arrangement involves increased capital expenditure, not only for the additional heat exchangers themselves but also for the complex piping and valve systems to control the gas flow. Furthermore, a second vacuum pump is necessary and the effectiveness of the scavenging gas is reduced.

It is, therefore, the principal object of the present invention to provide a process and apparatus for the removal of easily condensable components from a gas stream which extends the principles set forth in the above-mentioned copending application. A more specific object of this invention is to provide a process and apparatus for the purposes described which permits recovery of more than one relatively purified portion of the gas mixture at low capital expense in a simple and effective manner and with excellent thermal economy and heat balance.

These objects and others which will become apparent hereinafter, have been attained in a system for the removal of easily condensable components from a gas stream adapted to be separated into at least two relatively pure fractions, one of which is used in the manner described in application Ser. No. 389,612 for alternately operating counterflow heat exchangers in which precipitation of easily condensable components and sublimation thereof are alternately carried out; in accordance with the present invention another relatively pure fraction of the gas mixture, preferably derived from an air rectification installation, is passed through a "reversing exchanger" of the plate-type (e.g., as described on pages 11–14 and 11–15 of Perry's Chemical Engineers' Handbook) in which the chamber for the additional pure fraction is flanked by a pair of heat exchanger sections or chambers through which a portion of the crude gas is passed and functionally interchangeable to receive this crude gas (for precipitation of easily condensable components) and a relatively impure fraction of the gas (for flushing previously deposited carbon dioxide and water from the system). Thus the reversing exchanger has a chamber traversed only by the additional pure component and a pair of functionally interchangeable chambers in heat-exchanging relationship therewith and traversed alternately by a portion of the crude gas and the flushing fraction. The number of such reversing exchangers will, of course, depend upon the crude gas volume to be rectified. Furthermore, unlike the counterflow heat exchangers which process the remainder of the crude air in accordance with this method described in application Ser. No. 389,612, the reversing heat exchangers do not store either the heat of condensation or the heat of vaporization of the precipitated components.

In accordance with a further feature of this invention, at least a portion of the crude gas stripped from its easily condensable components by passage through the counterflow heat exchangers with or without storage of the heat of condensation in the manner set forth in the copending application identified above, is fed back to the counterflow heat exchanger after cooling below the dew point of the easily condensable components in order to raise the temperature of this portion above that of the cold crude gas emerging from the counterflow heat exchangers and delivered to the expansion turbine or other part of an air-rectification system. The warmed fraction of the crude gas can then be mixed with the cold portion so that the temperature of the gases fed to the turbine are sufficiently high to prevent the development of wet vapors during expansion.

Still another feature of this invention resides in the provision of three countercurrent heat exchangers having the capacity of storing the sublimation heat of the easily condensable component and periodically and functionally interchangeable in such manner that at least two of these heat exchangers sustain precipitation of the easily condensable components by heat exchange between the crude gas and a cool pure component obtained from the subsequent treatment stage. In the third heat exchanger of this group, a sublimation of the condensate or precipitate is carried out at a reduced pressure of 0.05–0.5 atmosphere (absolute) and preferably about 0.1 atmosphere with the aid of a scavenging gas as described above. This system has the advantage that only one third of the heat-exchange surface is used during each portion of the switchover cycle for heating the pure component by comparison with the 50% inherent when two heat exchangers are used in sequence. The arrangement is also advantageous when, in accordance with the method described in the aforementioned application, the flow of the crude gas mixture is continued somewhat beyond termination of the cooling-fluid flow before switchover of the heat exchangers. In this manner, the crude-gas section containing the precipitate is slightly warmed just before switchover so that the subsequent evacuation and scavenging steps are carried more efficiently. Since the scavenging gas frequently is at a temperature below that of the crude gas emerging from these heat exchangers, it has been found that this scavenging gas may impede the sublimation step. To avoid this, the present invention provides that relatively pure and warm gas, emerging from the heat exchangers of this group, may be mixed with the impure gas component to heat it prior to use as the scavenging gas.

Yet another feature of this invention resides in the provision of a reheating coil or chamber in either the reversing heat exchanger or the heat exchangers of the sublimation group (or both) for raising the temperature of the cold air to be fed to the turbine in order to eliminate any disadvantages arising from the function of wet gases therein during expansion.

The above and other objects, features and advantages will become more readily apparent from the following description, reference being made to the accompanying drawing in which the sole figure is a schematic flow diagram of an installation embodying the present invention.

In the drawing, I show a reversing exchanger 4 to which air can be supplied from a duct 1 via a conduit 2 and a valve 2' to flow through the chamber 3 of this heat exchanger as represented by the line 2a. During such passage through the reversing exchanger 4, any easily condensable components (e.g., $CO_2$ and $H_2O$) are precipitated and remain in the chamber 3 while the cooled gases, freed from the easily condensable components, pass through a check valve 5 into a conduit 5b which is branched at 22 and 23 to separate the air stream into a relatively small quantity (branch duct 23) and a relatively large quantity (branch duct 22).

The smaller quantity is delivered by line 23 to three tube or plate-type heat exchangers 24a, 24b and 24c in parallel, sufficient sensible heat being abstracted from the air mixture to condense it. The liquefied air is carried via line 25a away from the heat exchangers 24a, 24b and 24c to the bottom portion 26 of an air rectification tower A.T. operating in accordance with the Linde-Fränkl process. The liquid air is introduced into the bottom-tower portion 26 via a throttle valve 25.

The air-rectification tower is, generally speaking, the conventional Linde double column used for air separation at low temperatures. Such a tower is fully described at pages 12–28 of Perry's Chemical Engineers' Handbook, fourth edition, McGraw-Hill Publishing Co., New York (1963).

In such a tower, an elevated-pressure lower column is surmounted by an atmospheric-pressure column and the boiler of the upper column forms a reflux condenser for both columns. Air feed is at the base of the lower column and generally includes gaseous air with sufficient liquid air to compensate for withdrawal of condensed oxygen or nitrogen and heat leak into the system. The gaseous air condenses giving up heat to the boiling liquid and thus supplies a vapor flow for the column. The vapors rising in this column are partly condensed to form the reflux and the uncondensed vapor passes through an outer row of tubes of the reflux boiler so that liquid nitrogen collects in an annulus with liquid oxygen thereabove. While the air rectification tower is shown diagrammatically in the drawing, it will be understood that the pure nitrogen product is commonly recovered from the head of the tower and such nitrogen recovery is represented by the duct 31a. The liquid nitrogen spray at the head of the tower is supplied by a line 31b via a throttle valve 31c and is recovered from the annular collection trough 26a of the lower column in the usual manner. The feed for the upper column is drawn via a line 26b from the sump of the lower column and is delivered via throttle valve 26c to an intermediate portion of the upper column. Liquid oxygen is withdrawn at 31d from the upper column via a pump 31e to supply the line 33 as will become apparent hereinafter. A relatively incompletely purified nitrogen stream can be removed at an intermediate location of the upper column via a line 31f.

Returning now to a description of the processing of the cooled air stream emerging from the reversing heat exchanger 4, it will be seen that the larger portion of the air passes via duct 22 to a collecting line 28 partly via a bypass 27a and partly via a line 27 which leads the air through a chamber of the reversing heat exchanger 4. A valve or constriction 27b is provided in line 27a in order to regulate the bypass flow past the chamber 27 of the reversing heat exchanger. From the collecting line 28, the cold air flows to a conventional expansion turbine 29 in which the gas pressure is reduced and the temperature lowered. From the expansion turbine 29, the air, in a gaseous state, is delivered via line 30 to the lower column 26 of the air rectification tower A.T.

The reversing heat exchanger 4 is provided with a chamber represented at 7 through which a flow of impure nitrogen can be sustained. The impure nitrogen is withdrawn as a residual gas at 31f from the upper column 31 and is delivered to the heat exchanger 24a, there to flow countercurrent and in heat-exchanging relationship with the portion of the air stream delivered via line 23 to the heat exchanger. The somewhat warmed nitrogen stream passes via a line 6 through the check valve 32 into the chamber 7. The impure nitrogen stream is warmed by the heat-exchange surfaces of the reversing exchanger 4 and serves to vaporize precipitated water and carbon dioxide formed during the earlier stage of the cycle and thus constitutes a scavenging gas which is released to the atmosphere via a valve 8.

Pure oxygen is withdrawn via line 31d from the sump of the upper column 31 and delivered via line 33 to the heat exchanger 24b so as to cool the portion of the air passing therethrough to the lower column 26. From the heat exchanger 24b, the somewhat warm oxygen is delivered via a line 34a to the chamber 34 of the reversing exchanger 4. From the latter, the warmed oxygen is delivered at 35 to a consuming station (e.g., a storage tank or an oxygen-utilization line).

The pure nitrogen from the head of the column 31 is delivered by line 31a to a cooler 36 in which it transfers its sensible heat to the nitrogen spray (reflux) moving as represented by line 31b to the head of the column. From the supercooler 36 the pure nitrogen is delivered to the condenser 24c via line 36a and thereafter passes into a conduit 11 from which the warmed nitrogen stream is branched (lines 11a and 11b) to the heat exchangers 12a and 12b operating in accordance with principles set forth in the aforementioned copending application. The heat-storage exchangers 12a and 12b are, therefore, of the type described in this application and consist essentially of a chamber filled with a heat-storage mass (e.g., aluminum pellets) while a serpentine tube or tube bundle is imbedded in and surrounded by the mass. The pure nitrogen delivered by lines 11, 11a and 11b to the heat exchangers 12a and 12b passes through the outer chambers and is warmed before being supplied via lines 11c and 11d and valves 19a, 19b to the nitrogen output line 14. Thus air is introduced at 1 while pure nitrogen is recovered at 14 and pure oxygen is removed from the system at 35. The serpentine tubes or tube bundles 10a and 10b of the heat exchangers 12a and 12b pass air in countercurrent to the nitrogen flow through the respective heat exchangers, the air being directed via valves 37a and 37b communicating with line 1: the latter constitutes the air supply network. As described in application Ser. No. 389,612, the carbon dioxide and water vapor components of the air entering the heat exchangers 12a and 12b are deposited upon the walls of the tubes or tube bundles 10a and 10b. The larger portion of the cooled air emerging from the heat exchangers 12a and 12b are conducted via check valves 38a and 38b and a line 39 to the collecting duct 28 and the expansion turbine 29. The remainder of the air is passed again through a feedback serpentine 20a or 20b in each heat exchanger and (after abstraction of its easily condensable components) is rewarmed to a temperature slightly higher than the air input temperature to the turbine. From the feedback or rewarming tubes 20a and 20b this portion of the air passes via a respective check valve 9 into the line 28 whereby it can be mixed with the cold air delivered from line 39 to establish an air temperature in the turbine which is sufficiently high that, during expansion in the turbine, liquid droplets cannot form to damage the structural elements.

A further heat exchanger 13, structurally corresponding to the heat exchangers 12a and 12b and functionally interchangeable therewith as will be apparent hereinafter, has a tube serpentine or tube bundle 15 surrounded by the heat-storage chamber illustrated and described in the copending application mentioned above. The serpentine or tube bundle 15 contains the precipitated condensable components from the earlier half-cycle and is subjected to a reduced pressure of about 0.1 atmosphere via a valve 43c and a suction pump 16. The valve 37c connecting the tube bundle 15 with the air supply net is closed during this period while the scavenging gas is supplied via a branch 5a of the line 6. The impure nitrogen abstracted from the upper column 31 at an intermediate location (line 31f) and diverted to line 5a passes through a throttle valve 17 to a line 5c. From the latter line, the scavenging nitrogen stream flows through the check valve 18 to the tube 15. During this stage, the outer chamber of the heat exchanger 13 is blocked via the valve 19c, which closes communication between the outer chamber of the heat exchanger 13 and the nitrogen-delivering line 14, while the associated check valve 9 prevents induction of air from the line 28 into the feedback tube 21 and the main tube 15. It has been found that sublimation of the easily condensable components within the tube 15 is facilitated when the cold scavenging gas of line 5a is slightly warmed. For this purpose, a small quantity of warm dry gas (e.g., pure nitrogen from line 14) is delivered via a line 40 and a throttle valve 41 to the line 5c to raise the temperature of the scavenging gas about 20° C.

EXAMPLE

The installation illustrated in the drawing is used to treat 5400 m.³/hr. at standard temperature and pressure (S.T.P.) of ambient air which is at a pressure of 8.8 atmospheres (absolute). The output of the system is 1000 m.³/hr., S.T.P., of pure oxygen and 3300 m.³/hr., S.T.P., of pure nitrogen. The oxygen in this quantity is recovered at line 35 while the nitrogen is recovered at line 14. The indicated quantity of air is introduced at line 1.

Of the total amount of air treated, approximately 35% or 1900 m.³/hr., S.T.P., is fed via lines 1 and 2 through the chamber 3 of the exchanger 4 and is cooled therein to a temperature of 106° K. (Kelvin). Within the chamber 3 carbon dioxide and water vapor are condensed and precipitated from the cooled air which passes from the check valve 5 to the lines 22 and 23.

A small portion of this cold air stream (about 21% or approximately 400 m.³/hr., S.T.P.) is passed through the condensers 24a, 24b and 24c in which this portion of the air is liquefied and delivered to the bottom of the lower column 26 of the Linde-type air-rectification power. The larger portion of the cooled air (i.e., 79% or 1500 m.³/hr., S.T.P.) is led through the bypass arrangement 27 and 27a into the reversing exchanger 4 and thence to the expansion turbine 29; in the expansion turbine 29, the potential energy of the gas is converted to mechanical work until the gas attains a pressure corresponding to the pressure of the lower column 26 (i.e., about 5.7 atmospheres). The gases leaving the turbine have a temperature lower by about 12° C. than the input temperature of the gases fed to the turbine.

Simultaneously with the treatment of this quantity of air in the reversing exchanger 4, 1000 m.³/hr., S.T.P., of intermediate nitrogen is fed through the chamber 7 of the reversing exchanger 4 in counterflow to the air and thus serves to cool the latter to the aforementioned temperature of 106° K. This nitrogen stream sweeps any precipitated carbon dioxide and water from the chamber 7 as it passes therethrough, the gas being thereafter released to the atmosphere. The liquefaction of the air in the condensing heat exchangers 24a, 24b and 24c is carried out simultaneously in the following manner:

1000 m.³/hr., S.T.P., of pure oxygen is withdrawn from the sump of the upper column 31 (lines 31d and 33) and passed through the condenser 24b countercurrent to the air liquefying therein. Thereafter, this pure nitrogen is passed counterflow to the air in chamber 3 via the chamber 34 of the reversing exchanger.

3300 m.³/hr., S.T.P., of pure nitrogen is withdrawn from the head of the upper column 31 and delivered via lines 36a to the condenser 24c and thereby cools the corresponding portion of the air to liquefy it, the somewhat warmed nitrogen being fed to the heat exchangers 12a and 12b to process therein the remainder (i.e., 3500 m.³/hr., S.T.P.) of air such that the easily condensable impurities thereof are deposited in the respective tubes 10a and 10b.

Of the cooled air passing through the tubes 10a and 10b, approximately 65% or 2300 m.³/hr., S.T.P., is delivered at a temperature of 111° K. to the line 39. The remainder (35% or about 1200 m.³/hr., S.T.P.) is rewarmed in the feedback coils 20a and 20b for control of the temperature of the gas at the turbine.

During this portion of the complete operating cycle, the removal of previously deposited carbon dioxide and water by sublimation is carried out in the tubes 15. Thus the valves 19a and 19b are opened to permit discharge of the pure nitrogen while valve 19c is closed. Similarly valves 37a and 37b are opened to permit air to flow into the heat exchangers 12a and 12b whereas valve 37c is closed. Valves 43a and 43b are closed and valve 43c is open to connect the suction pump 16 with the tube 15. The suction pump generates a reduced pressure of about 0.1 atmosphere and approximately 100 m.³/hr., S.T.P., of scavenging gas (impure nitrogen) is drawn through the check valve 18 to facilitate sublimation of the impurities and sweep them from the tubes 15. As indicated earlier, the scavenging gas has its temperature raised by about 20° C. by addition of warm pure nitrogen via line 40 and throttle valve 41 to the line 55c.

Air and nitrogen are in heat-exchanging relationship in the countercurrent heat exchangers 12a and 12b while the nitrogen stream through the countercurrent heat exchanger 13 is blocked via valve 19c. When the tube serpentine or bundle 10a is sufficiently charged with precipitated carbon dioxide and water vapor, the nitrogen stream through heat exchanger 12a is terminated (by closing valve 19a) for a time sufficient to permit the continued flow of air through the tube 10a to increase its temperature by about 20° C. This staggering of the cutoff times of the air flow and the nitrogen flow, described in the copending application mentioned above, greatly facilitates the subsequent reduced pressure sublimation and scavenging of the precipitated product. When the temperature is increased as indicated at tube 10a, further influx of air is terminated by closing valve 37a preparatorily to interchanging the formations of heat exchangers 12a and 13. The tubes 15 are, in turn, cooled by the scavenging gas to about 20° C. below the temperature at which sublimation is effected so that, upon switchover, the pure nitrogen traversing the chamber 13 is delivered to line 14 in a correspondingly cooler condition. The switchover is achieved by closing valve 43c and opening valve 43a and on opening valves 37c and 19c, valves 19a and 37a having been closed earlier as described above.

Further losses of cooling power or so-called "cold loss" or "heat leak" can be avoided when one feeds the total quantity of nitrogen through the heat exchanger 12b during the period between cutoff of the nitrogen flow to heat exchanger 12a and prior to commencement of the nitrogen flow through heat exchanger 13. It is found that temperature differences at the warm ends of the heat exchangers are thus avoided.

Valves 42 are provided to vent at tubes 10a, 10b and 15 prior to opening communication with the vacuum pump. It will be understood that during each cycle the heat exchangers 13, 10a and 10b can thus be successively changed with easily condensable products, used for preliminary buildup of such products and thereafter subjected to a reduced-pressure sublimation. Independently thereof, when the tube 3 receives a sufficient deposit of carbon dioxide or water, valve 2' can be closed while valve 7' is open, valve 8 being closed with opening of valve 8' to reverse the functions of the chambers 3 and 7.

I claim:
1. A method of operating an installation for the removal of easily condensable components from a relatively warm crude-gas mixture adapted to be treated subsequent to the removal of said components therefrom to produce at least two relatively pure cool portions of said gas mixture and at least one further cool portion thereof, the installation including heat-exchanger means having a plurality of sections, said method comprising the steps of:

(a) passing part of said crude-gas mixture through a first of the sections of said heat-exchanger means in indirect heat-exchanging relationship with one of said relatively pure cool portions and with said further cool portion by passing the latter through a second section of said heat exchanger means to precipitate said components in said first section;

(b) thereafter switching the flow of said part of said crude-gas mixture and of said further cool portion to pass said crude-gas mixture through said second section and said further cool portion through said first section to flush from the latter the easily condensable components deposited in step (a) while concurrently subjecting the switched part of said crude-gas mixture to indirect heat exchange with said one of said relatively pure cool portions and with said further cool portion to condense an additional quantity of said easily condensable components in said second section;

(c) subjecting the remainder of said crude-gas mixture to indirect heat exchange with the other of said relatively pure cool portions in a third heat-exchanger section while precipitating the easily condensable components of said remainder of said crude-gas mixture therefrom in said third section; and (d) intermittently subjecting said third section to a reduced pressure of substantially 0.05 to 0.5 atmosphere absolute to volatilize the easily condensable components precipitated from said remainder of said mixture in said third section in step (c), and flushing therefrom the volatilized condensed components with a scavenging gas during the application of said reduced pressure, said remainder of said crude-gas mixture is subjected to heat exchange with said other relatively pure° cool portion in a group of at least three countercurrent heat exchangers having corresponding compartments traversed only by said other relatively pure cool portions and corresponding compartments selectively subjected to said reduced pressure and to flow of said remainder therethrough, said method further comprising the steps of passing said remainder of said gas mixture through at least two of said heat exchangers in heat-transferring relationship with said other relatively pure cool portion, concurrently volatilizing said easily condensable component in another heat exchanger of said group, and thereafter and periodically switching the functions of said heat exchangers in succession.

2. The method defined in claim 1, further comprising the step of (e) switching said remainder of said crude-gas mixture to a fourth heat-exchanger section previously subjected to reduced pressure in step (d) and flushed with a scavenging gas during application of the reduced pressure and passing the switched remainder of the crude-gas mixture in indirect heat-exchanging relationship with said other relatively pure cool portion while the third section is subjected to reduced pressure and flushing in step (d), said first and second sections and said third and fourth sections being periodically functionally interchanged, the scavenging gas employed for flushing said third and fourth sections having a flow rate $M_s$ equal substantially to between $P_sM_c/P_c$ and $3P_sM_c/P_c$ where $P_c$ is the pressure in atmospheres absolute of the remainder of the crude-gas mixture passed through said third and fourth sections, respectively, $P_s$ is the scavenging gas pressure in atmospheres absolute, $M_c$ is the flow rate in cubic meters per hours of the remainder of the crude-gas mixture passed respectively through the third and fourth sections and $M_s$ is the flow rate in cubic meters per hour of the scavenging gas, said scavenging gas being branched off from said further cool portion.

3. The method defined in claim 1 wherein the part of the cold crude gas stream deriving from heat exchange with said one of said relatively pure cool portions is supplied to an expansion turbine, further comprising the step of heating a fraction of said stream by heat exchange after precipitation of the easily condensable components therefrom and thereafter mixing the heated fraction with the remainder of said stream prior to introduction into said turbine.

4. The method defined in claim 1 wherein prior to switching of the functions of said heat exchangers the flow of said other cool portion through one of the heat exchangers traversed by said crude-gas mixture is terminated while the flow of the crude-gas mixture is continued to warm the corresponding heat exchanger prior to subjecting same to said reduced pressure.

5. The method defined in claim 1 wherein a fraction of said further portion is supplied to the section subjected to reduced pressure as the scavenging gas, said method further comprising the step of admixing with said scavenging gas a quantity of one of said pure portions upon the warming thereof by heat exchange to raise the temperature of the scavenging gas prior to its introduction into the section subjected to reduced pressure.

6. An installation for the removal of easily condensable components from a relatively warm crude-gas mixture adapted to be treated subsequent to removal of said components therefrom to produce at least two relatively pure cool portions of the gas mixture and at least one further cool portion thereof, said installation comprising:
  (a) a first heat exchanger having at least three compartments in indirect heat-exchange relationship;
  (b) means for feeding part of said relatively warm crude-gas mixture through a first of said chambers, while passing said further cool portion through a second chamber thereof and one of said relatively pure cool portions through a third chamber of said first heat exchanger to precipitate from said part of said crude-gas mixture in said first chamber the easily condensable components contained in said part;
  (c) at least a pair of functionally interchangeable second heat exchangers having corresponding first and second compartments in indirect heat-exchanging relationship with each other;
  (d) means for feeding the remainder of said relatively warm crude-gas mixture through at least a first compartment of at least one of said second heat exchangers while the corresponding compartment of another of said second heat exchangers contains a previously precipitated portion of said easily condensable components while the other relatively pure cool portion is passed through the other compartment of the second heat exchanger through which the remainder of the crude-gas mixture is passed to precipitate therefrom the easily condensable components contained in said remainder of said crude-gas mixture;
  (e) means for subjecting the compartment containing previously precipitated easily condensable components of the other of said second heat exchangers to a reduced pressure of the order of 0.05 to 0.5 atmosphere absolute to volatilize the previously precipitated easily condensable components and flushing them from said other of said second heat exchanger with a scavenging gas;
  (f) means periodically functionally interchanging said first and second chambers of said first heat exchanger and the second heat exchanger compartments;
  (g) an air rectification tower, said crude-gas mixture being air, said easily condensable components being carbon dioxide and water, one of said relatively pure portions being nitrogen derived from said column, the other of said relatively pure portions being oxygen derived from said column, said further portion being impure nitrogen derived from said column;
  (h) three third heat exchangers traversed in parallel by the relatively cool crude-gas mixture drawn from said first heat exchanger and cooled by the relatively pure oxygen, the relatively pure nitrogen and the impure nitrogen, respectively, said second heat exchangers each being formed with a heat-storage mass cooled by said other relatively pure portion and in heat-exchanging relationship with the compartments traversed by said crude-gas mixtures;
  (i) an expansion turbine connected between said second heat exchangers and said column for delivering to the latter relatively cool crude-gas mixture derived from said second heat exchangers; and
  (j) means branching a fraction of said further portion therfrom for passage to said other of said second heat exchangers as the scavenging gas.

References Cited

UNITED STATES PATENTS

| | | | |
|---|---|---|---|
| 2,460,859 | 2/1949 | Trumpler | 62—14 |
| 2,513,306 | 7/1950 | Garbo | 62—13 |
| 2,586,811 | 2/1952 | Garbo | 62—13 |
| 2,836,040 | 5/1958 | Schilling | 62—3 |
| 2,840,994 | 7/1958 | Lobo | 62—14 |
| 2,915,880 | 12/1959 | Schuftan et al. | 62—13 |
| 3,059,439 | 10/1962 | First et al. | 62—13 |
| 3,063,247 | 11/1962 | Yendall | 62—13 |
| 3,258,930 | 7/1966 | Jakob | 62—13 XR |
| 3,126,265 | 3/1964 | Yendall et al. | 62—14 |
| 3,364,686 | 1/1968 | Becker | 62—14 |

NORMAN YUDKOFF, Primary Examiner

U.S. Cl. X.R.

62—38, 41